Oct. 16, 1934.  J. L. SPENCE, JR  1,977,153
MOUNT FOR MOVING PICTURE CAMERAS
Original Filed May 23, 1928
Fig.1
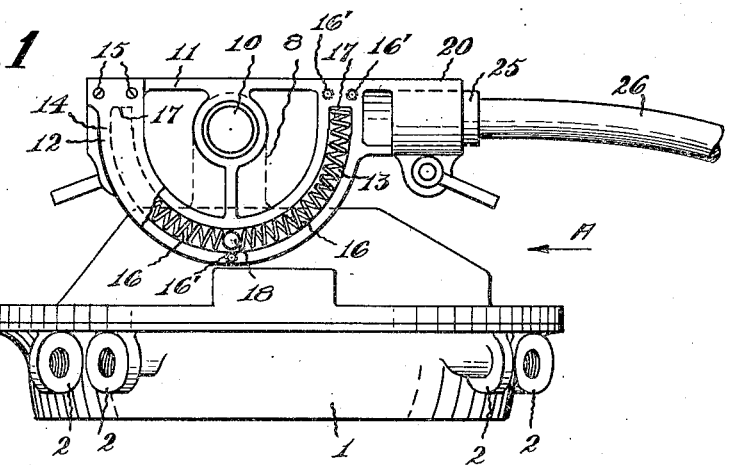
Fig.2
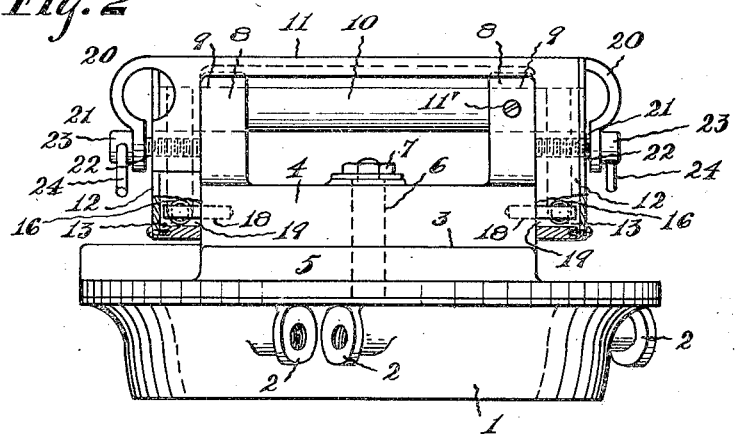
Fig.3
INVENTOR
John L. Spence Jr.,
BY
Harold O. Penney
ATTORNEY Patented Oct. 16, 1934

1,977,153

UNITED STATES PATENT OFFICE 1,977,153

MOUNT FOR MOVING PICTURE CAMERAS

John Livingston Spence, Jr., Brooklyn, N. Y., assignor, by mesne assignments, to Remac Patents Corporation, New York, N. Y., a corporation of New York Application May 23, 1928, Serial No. 280,014
Renewed October 7, 1933

6 Claims. (Cl. 248—47)

My present invention relates to an improvement in a mount for cameras, and more specifically to an improvement in a movable platform for moving picture cameras.

The main object of my invention is the provision of a universally movable platform for the mounting thereon of a camera, above the vertical tilting axis of the platform, to which platform is attached means for permitting the affixing thereto of the legs forming the tripod with the further important provision of means whereby the vertical, angular movements of the platform and camera are controlled, in the varying angular camera positions, to balance and compensate for the weight of the camera when in such angular positions.

Another object of my invention is to provide a simple platform which permits of not only vertical movement of the camera throughout a limited degree of angular movement, but also to provide means on said mount whereby the camera may be simultaneously swung, horizontally and freely, in any direction about its horizontal axis.

Another object of my invention is to provide a means for permitting the easy introduction or removal of a handle for operating the camera for combined vertical and horizontal movement.

In the accompanying drawing:

Fig. 1 shows my improved platform in side elevation.

Fig. 2 is a front view thereof, looking in the direction of the arrow A, Fig. 1.

Fig. 3 is an assembled view showing an exaggerated condition of the tilt-table with the camera mounted thereon, in overbalanced or angular position.

My present camera tripod mount is constructed of essentially three main parts, excluding the handle, in which, as shown in the various figures, 1 is the base thereof, made preferably in the form of a casting, and having provision thereon in the form of a plurality of threaded side lugs 2 whereby the familiar type of legs forming the tripod, not shown, may be affixed thereto.

The upper surface of the base 1 is provided with a finished surface 3 upon which is pivotally mounted a horizontally rotatable turntable 4, the under surface 5 of which is also smoothly machined, for rotatably fitting upon the surface 3, the said turntable being held in rotary or pivotal relation to the base plate 1 by a stud 6, which is firmly mounted in the base plate 1 and is threaded at its upper shouldered end to receive a washer and lock nut assembly 7, in well known manner.

The turntable 4 is further provided with two upstanding, opposed bearings 8, these being fully shown in Fig. 2, across which is mounted in suitable bores 9 a tilt-table shaft 10, which extends outwardly from said bearings and rotatably mounts thereon a tilting table 11. The shaft 10 is locked to one of the bearings by a set screw 11', Fig. 2.

The tilt-table 11, in side elevation, comprises, as shown in Fig. 1, the upper platform and two sector-like downwardly depending side members 12, the axes of which sectors are bored to receive the outstanding ends of the shaft 10, whereby the said sector may be tilted thereon in opposite desired angular relations or positions upon and relative to the turntable 4, one of such angular positions being shown in Fig. 3.

The two sectors of the tilting table 11 are provided with radially developed circumferential recesses or spring pockets 13, which may be either machined or cast therein, and these pockets are covered with a cover plate 14, suitably affixed in operative relation by screws 15 and screw holes 16', one of these plates being shown in Fig. 1, as a fragment, part of the same being broken away in order to show the mounting in each of said recesses 13 of two opposing coiled springs 16, said springs being mounted within the said recess 13, as shown in Fig. 1, the upper end portions thereof abutting against shoulders 17 which terminate the recesses 13, and the lower end of the springs 16 abutting against the fixed pins 18 which are fitted with a drive fit in the rotatably horizontal turntable 4 and project into the said recesses 13 a sufficient distance, as indicated in Fig. 2, thereby to act each as a fixed, central abutment for the lower ends of the springs 16, and against which pins the springs are compressed, in alternate movements of the sector 12.

As indicated in the broken away portions of the opposite sectors in Fig. 2, the back wall of the sector recesses are slotted circumferentially, as at 19, thereby to provide a slot for clearing the spring stop pin 18 in turntable 4, during the radial or angular motion of the tilt-table 11.

Obviously, when the tilt-table is operated about shaft 10 any movement in one direction or the other causes one spring 16 in each recess 13 to be compressed, if the angular motion is on that side of the spring, and permits the other spring 16 in each recess 13 to become extended.

It is further obvious that angular motion in compressing one spring 16 in each recess 13, as indicated in Fig. 3, gradually increases the resistance to the tilting on the side of the compressed spring, as the camera is moved angularly, thereby tending to react against the load, such as the camera C, mounted by its base B upon the upper surface of the tilt-table 11, thereby tending to balance, or counterbalance, the weight of the camera on the side to which it is tilted out of true vertical position.

As a means for manipulating this combined universal mount, as it is normally mounted upon a tripod and carries a camera thereon, I have provided, for convenience, that each of the sector members 12 be provided with an axially extended handle clamp socket 20, which is split at the lower cylindrical face, as at 21, and is provided at the split points with a pair of downstanding clamp lugs 22, each of which is bored and receives therein the shouldered end of a threaded stud member 23 having a dowel thumb-pin 24 thereon, whereby the said stud 23 may be screwed in and out to lock the handle bushing 25, Fig. 1, of a handle 26, said handle being fully shown in Fig. 3. The studs 23 are threaded into the opposing clamp faces 22', as shown dotted at 23', Fig. 2.

Thus, at the operator's convenience, the said handle may be readily and quickly removed from one side sector to the other, and clamped therein for ease and convenience of operation, the handle being rotatably settable in any position desired.

In operation, with the assembly about as shown in Fig. 3, and with the base 1 having the usual tripod legs affixed thereto, not shown, the operator in taking pictures of moving objects is free to operate the complete assembly by the handle 26, for rotative or horizontal movement and, if desired, to cause simultaneously therewith vertical or tilt-table movement, and during such latter movement any tendency of the camera, due to the angle position, to overweight the tilt-table 11, is compensated by reaction of the compressed spring 13, as previously described, such reaction increasing as the load increases and further compresses the spring 13 so that the camera is substantially balanced in any angular position. By the word "balanced" it is meant that the forces of gravity and the spring, which tend to turn the tilt table on its axis of tilt are substantially equal and opposite in their turning effect, so that of these forces there is no resultant tending to rotate the tilted camera either up or down.

Having thus described my invention, what I claim is:

1. A camera mount of the class described comprising a base portion and a tilt-table thereon adapted to support a camera, sectors depending from said tilt-table having recesses, opposed springs disposed in said recesses, and means operatively associated with said base and cooperating with said springs placing said springs under compression in balancing the weight of the camera.

2. A camera mount of the class described comprising a base portion, a turntable rotatably mounted on said portion, a tilt-table carried by said turntable and being provided with split opposed springs, and means projecting from said turntable engaging said springs placing said springs under compression in balancing the camera, spring bushings carried by said tilt-table, handles disposed in said bushings, and means for clamping said handles in said bushings.

3. In a tripod, the combination of a relatively stationary element, a camera supporting member rotatable about the horizontal axis of said element, a projection on said element, an arcuate recess formed in said member, and a pair of springs in said arcuate recess, each having one end abutting against said member and its other end abutting against said projection whereby compensation is made for the weight of the camera when the member is rotated in a vertical plane.

4. A camera support comprising in combination with a turn-table and a tilting table pivotally mounted on said first table, a pin rigid with said first table, means rigid with said tilting table and having therein an arcuate slot, and compressible and expansible means disposed in said slot and engaging opposite sides of said pin for holding said tilting table in a selected position, said arcuate slot having its center on the pivot of said latter table.

5. A camera support comprising in combination with a turn-table and a swingable tilting table having a handle, a pivot carried by said first table and whereon said second table is mounted, a pin rigid with said first table, means rigid with said tilting table and having therein an arcuate slot, in which latter said pin is disposed, a compressible and expansible spring terminally engaging one boundary end wall of said slot and one side of said pin, and another compressible and expansible spring terminally engaging the other boundary end wall of said slot and the opposite side of said spring, whereby to hold said tilting table balanced in any selected position subsequent to operation of said handle.

6. A camera support comprising in combination a levelling table, a turn-table carried by said first table, a tilting table pivotally mounted on said turn-table a pin rigid with said latter table, means rigid with said tilting table and having therein an arcuate slot, and compressible and expansible means disposed in said slot and engaging opposite sides of said pin for holding said tilting table in a selected position, said arcuate slot having its center on the pivot of said latter table.

JOHN LIVINGSTON SPENCE, JR.